United States Patent [19]

Bullard

[11] Patent Number: 5,515,773
[45] Date of Patent: May 14, 1996

[54] STEAM OVEN

[75] Inventor: Charles R. Bullard, Crossville, Tenn.

[73] Assignee: The Rival Company, Kansas City, Mo.

[21] Appl. No.: 389,258

[22] Filed: Feb. 16, 1995

[51] Int. Cl.⁶ .................................................. A47J 27/04
[52] U.S. Cl. .................... 99/330; 99/339; 99/467; 99/476; 99/483; 99/516; 126/20; 126/369; 219/385; 219/401
[58] Field of Search ............................ 99/330, 331, 339, 99/340, 400, 401, 444–446, 467, 468, 469, 473, 474, 476, 480, 483, 516, 536; 126/20, 21 A, 369, 369.1, 369.2, 20.1, 20.2; 219/401, 441, 442, 385, 386, 521; 426/510, 523; D7/350

[56] References Cited

U.S. PATENT DOCUMENTS

| 244,180 | 7/1881 | Campbell . |
| D. 262,540 | 1/1982 | Lovejoy et al. . |
| 263,049 | 8/1882 | Krehbiel . |
| D. 272,407 | 1/1984 | Notbohm . |
| 279,956 | 6/1883 | Knous . |
| D. 279,956 | 8/1985 | Eyck et al. . |
| 282,587 | 8/1883 | Swink . |
| D. 301,428 | 6/1989 | Viancin . |
| D. 318,775 | 8/1991 | Bonnet et al. . |
| D. 333,782 | 3/1993 | van Berlo . |
| 354,240 | 12/1886 | Roberts . |
| 366,960 | 7/1887 | Johnson et al. . |
| 560,336 | 5/1896 | Willson . |
| 607,759 | 7/1898 | Mathy . |
| 636,528 | 11/1899 | Henderson . |
| 776,926 | 12/1904 | Misener . |
| 780,851 | 1/1905 | Wilson . |
| 869,903 | 11/1907 | Harloe . |
| 907,154 | 12/1908 | Lewis . |
| 925,781 | 9/1909 | Mathy . |

(List continued on next page.)

FOREIGN PATENT DOCUMENTS

| 75371 | 2/1919 | Austria . |
| 989923 | 5/1976 | Canada . |
| 1002571 | 12/1976 | Canada . |
| 25389 | 10/1986 | Canada . |
| 1082456 | 12/1954 | France . |
| 75858/123.737 | 2/1978 | France . |
| 270722 | 9/1912 | Germany . |
| 271879 | 8/1927 | Germany . |
| 271878 | 8/1927 | Germany . |
| 2329 | of 1909 | United Kingdom . |
| 5969 | of 1912 | United Kingdom . |
| 7612 | of 1913 | United Kingdom . |
| 209721 | 11/1924 | United Kingdom . |

OTHER PUBLICATIONS

Maverick Meal Steamer Operation instructions and Recipe Book. Published by Maverick Industries, Edison, N.J., Nov., 1992.

Primary Examiner—Timothy F. Simone
Attorney, Agent, or Firm—Willian Brinks Hofer; Michael P. Chu

[57]                ABSTRACT

A steam oven includes a chamber for receiving food, a water tank having a discharge valve, and a reservoir in communication with the water tank and the chamber. A barrier divides the reservoir in a receiving compartment and a separate boiling compartment. A passage in the barrier allows the receiving compartment and the boiling compartment to fluidly communicate with each other. In use, water flows from the water tank into the receiving compartment, and then from the receiving compartment into the boiling compartment to be converted into steam. The barrier retards heat transfer from the water in the boiling compartment to the water in the receiving compartment to prevent the water in the receiving compartment from becoming agitated to an extent where air would be allowed to flow through the discharge valve into the water tank, thereby causing an untimely release of water from the water tank into the reservoir.

20 Claims, 3 Drawing Sheets

U.S. PATENT DOCUMENTS

| | | |
|---|---|---|
| 926,028 | 6/1909 | Smith . |
| 1,175,442 | 3/1916 | Hensel et al. . |
| 1,608,395 | 11/1926 | Hanks . |
| 2,089,411 | 8/1937 | Olsson et al. . |
| 2,131,663 | 9/1938 | Hughes . |
| 2,145,263 | 1/1939 | Huntzinger et al. . |
| 2,554,412 | 5/1951 | Kavanagh . |
| 2,662,591 | 12/1952 | Bramberry . |
| 2,715,898 | 8/1955 | Michaelis et al. . |
| 2,718,842 | 9/1955 | Klemm . |
| 2,761,375 | 9/1956 | Jepson . |
| 2,766,366 | 10/1956 | Eckhoff . |
| 2,947,304 | 8/1960 | Ashley . |
| 3,078,783 | 2/1963 | Lee, Sr. . |
| 3,147,689 | 9/1964 | Sakamoto et al. . |
| 3,275,801 | 9/1966 | Churchill . |
| 3,485,163 | 12/1969 | Arita . |
| 3,659,584 | 5/1972 | Doyle et al. . |
| 3,677,171 | 7/1972 | LeVan ........... 99/339 |
| 3,869,595 | 3/1975 | Collins et al. . |
| 4,011,805 | 3/1977 | Vegh et al. . |
| 4,045,653 | 8/1977 | Soper et al. . |
| 4,052,590 | 10/1977 | Anderl et al. . |
| 4,115,918 | 9/1978 | Anderl et al. . |
| 4,148,250 | 4/1979 | Miki et al. . |
| 4,173,215 | 11/1979 | Bureau et al. ........... 126/369 |
| 4,197,791 | 4/1980 | Vieceli et al. . |
| 4,244,979 | 1/1981 | Roderick . |
| 4,281,636 | 8/1981 | Vegh et al. . |
| 4,452,132 | 6/1984 | Miller et al. . |
| 4,506,598 | 3/1985 | Meister . |
| B 4,509,412 | 1/1994 | Whittenburg et al. . |
| 4,509,412 | 4/1985 | Whittenburg et al. . |
| 4,520,250 | 5/1985 | Ishihara et al. ........... 99/325 |
| 4,585,661 | 4/1986 | Brummett . |
| 4,641,630 | 2/1987 | Meister . |
| 4,650,968 | 3/1987 | Williams . |
| 4,655,192 | 4/1987 | Jovanovic . |
| 4,700,685 | 10/1987 | Miller . |
| 4,701,334 | 10/1987 | Durth . |
| 4,701,340 | 10/1987 | Bratton et al. ........... 426/523 |
| 4,817,582 | 4/1989 | Oslin et al. ........... 126/20 |
| 4,823,766 | 4/1989 | Violi ........... 99/476 |
| 4,920,251 | 4/1990 | Whitenack et al. . |
| 4,924,072 | 5/1990 | Oslin ........... 219/401 |
| 5,014,679 | 5/1991 | Childs et al. ........... 126/369 |
| 5,078,120 | 1/1992 | Hwang ........... 126/21 A |
| 5,097,753 | 3/1992 | Naft . |
| 5,103,076 | 4/1992 | Houkuwa ........... 219/401 |
| 5,215,000 | 6/1993 | Desage et al. ........... 99/483 |
| 5,460,158 | 10/1995 | Rigaud ........... 126/20 |

STEAM OVEN

BACKGROUND OF THE INVENTION

The present invention relates generally to the field of steam ovens for steam-cooking foods, and more particularly to improvements for steam ovens.

Commercial and household steam ovens have been used for years to steam-cook foods, including rice, poultry and vegetables. While the size and shape of known steam ovens may vary depending on their particular use (e.g., restaurant versus home), steam ovens generally include a boiling reservoir in which water is converted into steam and a food-steaming compartment.

In one type of conventional steam oven, a user pours water directly into the boiling reservoir when food steaming is desired. Typically, the boiling reservoir is located inside the steam oven, and a door, panel or similar structure must be opened or removed to gain access to the boiling reservoir. Generally, the water is boiled in the boiling reservoir by means of a heating element positioned in the boiling reservoir.

A second type of conventional steam oven includes a separate water tank that communicates with the reservoir. In many designs, the water tank is accessible from the exterior of the steam oven to permit ready filling of the water tank by the user. Typically, the water tank includes some sort of discharge valve to regulate the flow of water into the reservoir. Otherwise, water could overflow the boiling reservoir and create a safety hazard.

One type of conventional water tank is designed to hold water therein by means of a vacuum formed in the top of the water tank and a water discharge valve that is responsive to water level changes in the given appliance. When the water tank is filled and the water discharge valve is opened, the open water discharge valve allows air to flow into the water tank (i.e., from an area of atmospheric pressure to an area of zero or near-zero pressure). Consequently, in a steam oven, water is forced to flow from the water tank into the boiling reservoir. The water flow into the boiling reservoir continues until the water level in the boiling reservoir covers the opening of the water discharge valve. At this point, the air flow through the water discharge valve into the water tank is stopped, and the water flow from the water tank into the boiling reservoir is terminated. After sufficient water is converted into steam by the heating element to uncover the opening of the discharge valve, air is once again able to flow into the water tank to cause water to be discharged therefrom into the boiling reservoir. This process continues until all of the water is drained from the water tank or the steam oven is deactivated.

In steam ovens having separate water tanks and boiling reservoirs, untimely and unregulated water flow from the water tanks can occur. Specifically, as the heating element heats and eventually boils the water in the water reservoir, the water becomes increasingly agitated. As the agitation increases to a maximum (i.e., where the water is at a complete boil), the water adjacent to the water discharge valve contorts and uncovers, with steadily increasing frequency, the opening of the water discharge valve, even though the water level, in a normal (i.e., unagitated) state, is such that the valve opening would normally be covered. As a result, water is discharged from the water tank into a boiling reservoir that already contains its operating complement of water. Consequently, an overflow of water from the boiling reservoir may occur, which can cause a safety hazard for users of the steam oven.

SUMMARY OF THE INVENTION

The present invention provides a steam oven that is designed to prevent the untimely and unregulated discharge of water from a water tank into a boiling reservoir. The steam oven includes a reservoir that is configured to prevent water adjacent to a discharge valve in the water tank from becoming sufficiently heated and agitated to uncover the valve opening, thereby allowing air to flow into the water tank and causing water to be discharged from the water tank.

According to a first aspect of the present invention, a steam oven includes a chamber for receiving food, a water tank having a discharge valve, and a reservoir in communication with the water tank and the chamber. The reservoir includes a receiving compartment and a boiling compartment that are separated by a wall. The wall defines a passage that allows the receiving compartment and the boiling compartment to fluidly communicate with each other. In use, water flows from the water tank into the receiving compartment, and then from the receiving compartment into the boiling compartment to be converted into steam. The wall functions to retard heat transfer from the water in the boiling compartment to the water in the receiving compartment to prevent the water in the receiving compartment from becoming agitated to an extent where air would be allowed to flow through the discharge valve into the water tank, thereby causing an untimely release of water from the water tank into the reservoir.

According to a second aspect of the present invention, a steam oven includes a chamber for receiving food, a water tank, and a reservoir in communication with the water tank and the chamber. The reservoir includes a receiving compartment and a separate boiling compartment. The receiving and boiling compartments fluidly communicate with each other. The receiving compartment defines an aperture in communication with the atmosphere. In use, water flows from the water tank into the receiving compartment, and then from the receiving compartment into the boiling compartment to be converted into steam. The aperture operates to vent heated air in the receiving compartment to the atmosphere.

According to a third aspect of the present invention, a steam oven includes a chamber for receiving food, a water tank having a discharge valve and a water fill cap, and a reservoir in communication with the water tank and the chamber. The reservoir includes a receiving compartment, a boiling compartment, a wall separating the receiving compartment and the boiling compartment, and a third compartment for accommodating the water fill cap of the water tank. The wall defines a passage that allows the receiving and boiling compartments to fluidly communicate with each other. The receiving compartment defines an aperture in communication with the atmosphere. The aperture operates to vent heated air in the receiving compartment to the atmosphere. In use, water flows from the water tank into the receiving compartment, and then from the receiving compartment into the boiling compartment to be converted into steam. The wall operates to retard heat transfer from the air and water in the boiling compartment to the air and water in the receiving compartment to prevent the water in the receiving compartment from becoming agitated to an extent where air would be allowed to flow through the discharge valve into the water tank, thereby causing an untimely release of water from the water tank into the reservoir.

The present invention provides a reservoir having a dual compartment structure that allows the steam oven to be used without fear of a water overflow created by the undesired and/or unregulated release of water from the water tank into the reservoir.

These and other features and advantages of the present invention will be further understood upon consideration of the following detailed description of the present invention, taken in conjunction with the accompanying drawings.

DETAILED DESCRIPTION OF THE PRESENTLY PREFERRED EMBODIMENTS

The steam oven 10 of the present invention may be used to cook, heat or re-heat foods, including vegetables, rice, poultry and shrimp, by steaming. Food steaming is desirable because, as contrasted with other cooking techniques, such as boiling, it reduces the amount of essential vitamins and minerals that are removed from the food during cooking.

As will be explained in greater detail below, the steam oven 10 of the present invention basically operates by converting water into steam by means of a heating element. The resultant steam is directed into a cooking chamber holding the food to be steamed. The steam cooks the food, and excess steam is vented to the outside environment by means of a steam vent. Various control elements, including a timer and a thermostat, control the heating element to regulate steam production.

Figure 1:
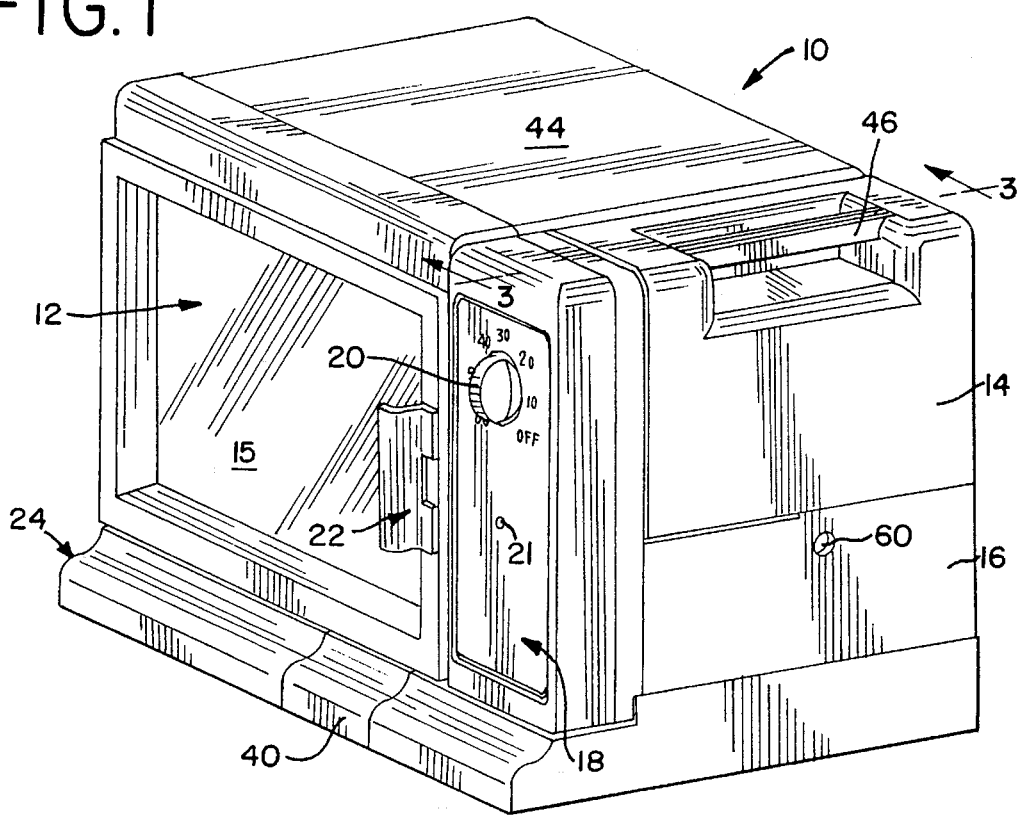
FIG. 1 is a perspective view of a preferred embodiment of the steam oven of the present invention.

Turning now to the drawings, FIGS. 1–4 illustrate a preferred embodiment of the steam oven 10 of the present invention. As shown in FIG. 1, the steam oven 10 includes a door 12, a removable water tank 14 for holding and supplying water to the steam oven 10, a reservoir 16 for receiving water from the water tank 14 and in which the water is converted to steam, and a control panel 18, including a timer 20 and a pilot light 21, for operating the steam oven 10.

The door 12 includes a handle and latch mechanism 22 for releasably closing the door 12. For viewing the interior of the steam oven 10, the door 12 includes a pane of glass or plastic 15. In addition, the door 12 is sealed around its periphery to prevent condensate from dripping from the steam oven 10.

Figure 2:
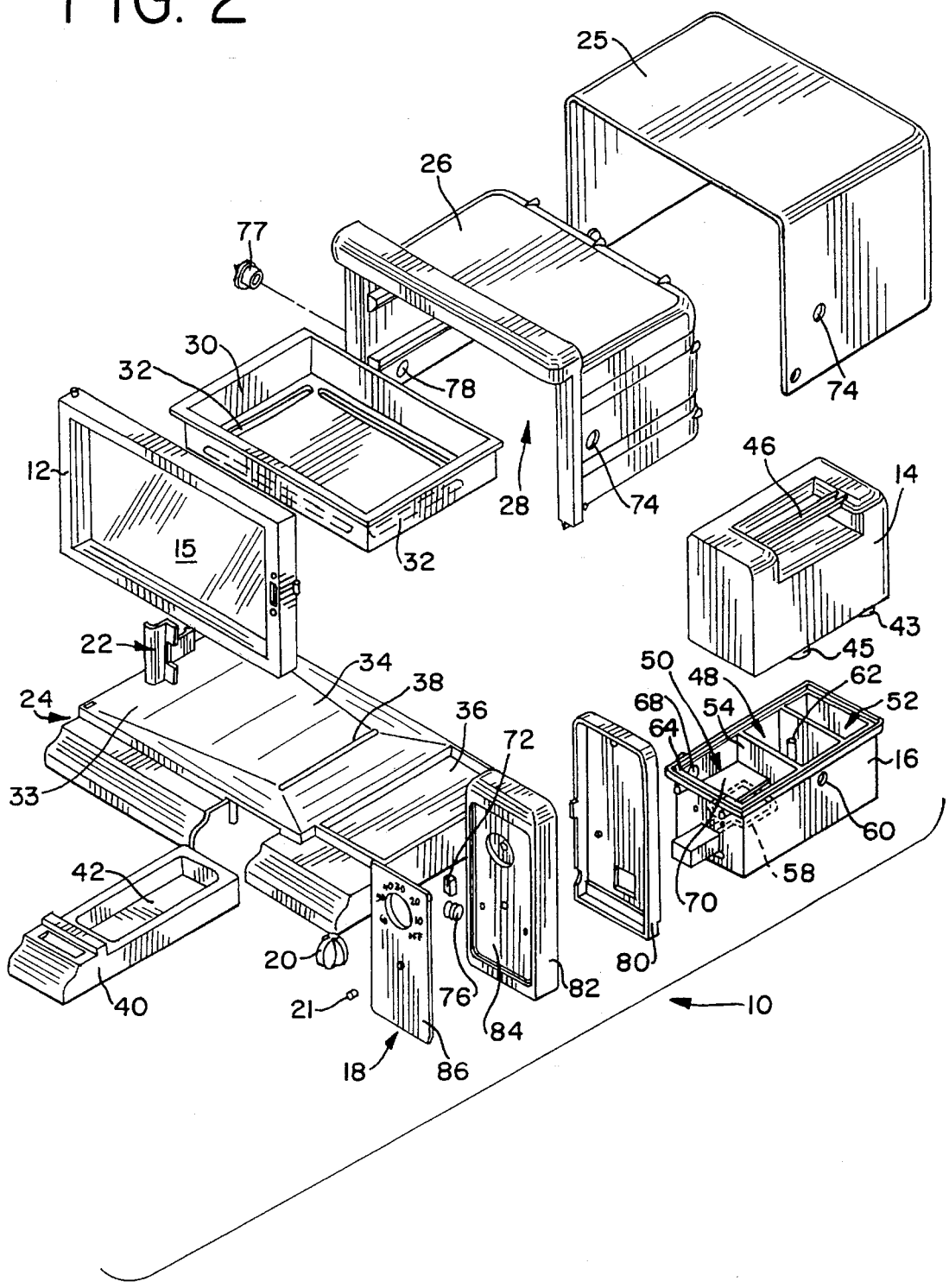
FIG. 2 is an exploded view of the steam oven shown in FIG. 1.

As best shown in FIG. 2, the steam oven 10 further includes an outer housing 25 situated on a base 24. The base 24 cooperates with an inner housing 26 and the door 12 to define a chamber 28 accessible through the door 12 for receiving and steaming food. The outer housing 25 insulates the surrounding outside environment, including the user of the steam oven 10, from the heat generated inside the chamber 28.

At least one food tray 30 is disposed within the chamber 28 for supporting the food to be steamed. The food tray 30 defines a plurality of slots 32 that operate to drain condensate away from the food toward the base 24. By draining condensate away from the food, the food tray 30 prevents the food from becoming "soggy" during steaming. Instead of or in addition to the slots 32, a plurality of perforations may be placed along the entire bottom surface of the food tray 30. When a food such as rice, which requires water to be correctly prepared, is to be cooked in the steam oven 10, a solid-bottomed food tray (not shown) is utilized.

As also shown in FIG. 2, the base 24 includes an upper surface 33 that defines a contoured bottom wall 34 of the chamber 28 and a recessed area 36. The bottom wall 34 defines an elongated slot 38 located along the bottom-most portion thereof. The contoured bottom wall 34 receives the condensate drippings from the food tray 30 and, in cooperation with the slot 38, diverts the condensate from the chamber 28 to a drip tray 40 located under the slot 38. The drip tray 40, as shown, includes a cavity 42 for collecting the condensate from the chamber 28. After use of the steam oven 10, the drip tray 40 may be removed from the base 24 and emptied of its contents.

Figure 3:
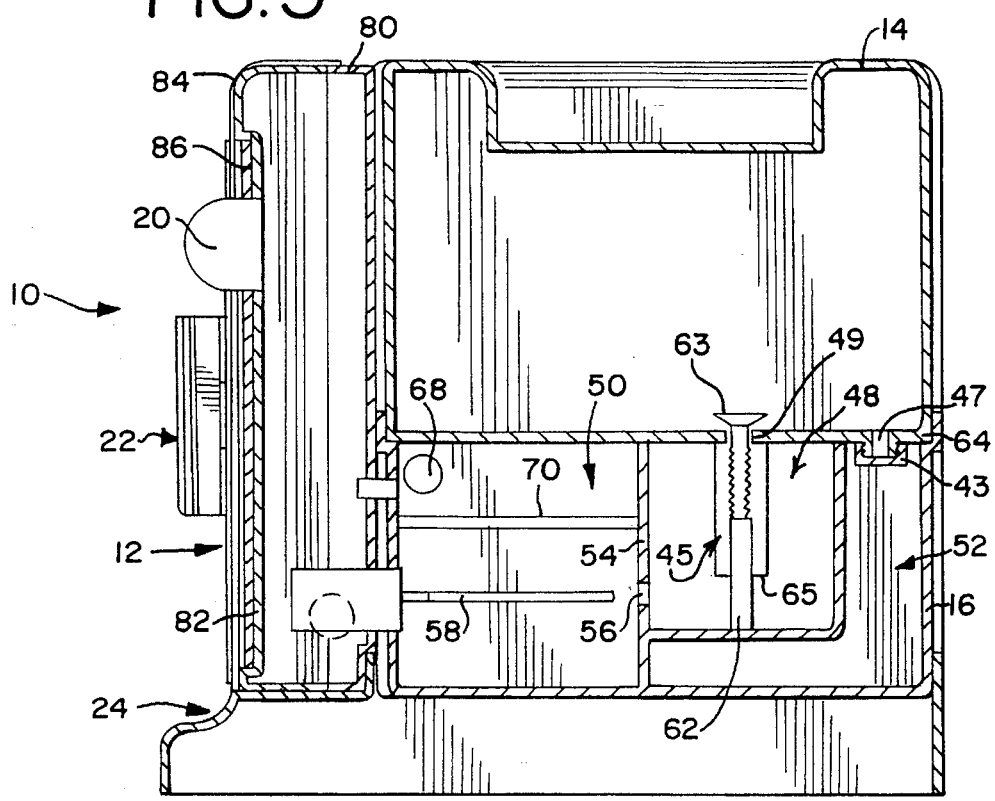
FIG. 3 is a cross-sectional view taken along line 3—3 of FIG. 1.
Figure 4:
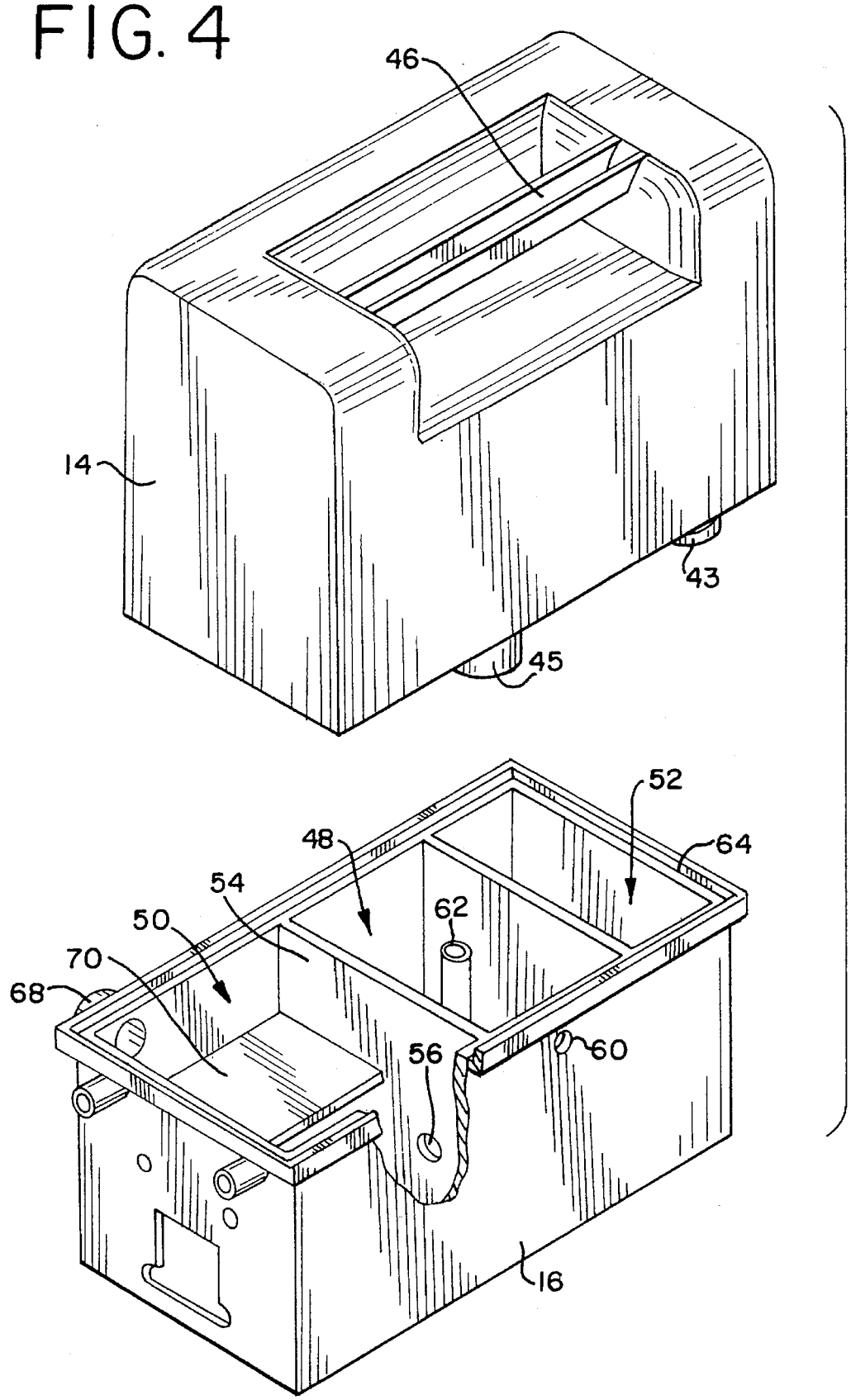
FIG. 4 is an exploded view of the water tank and the reservoir of the steam oven shown in FIGS. 1–3.

As best shown in FIG. 2, the reservoir 16 is positioned within the recessed area 36 of the base 24, and the water tank 14 is preferably supported on top of and in fluid communication with the reservoir 16. As shown in FIGS. 3 and 4, the reservoir 16 is divided into a water receiving compartment 48, a boiling compartment 50 and a fill cap compartment 52. The receiving compartment 48 and the boiling compartment 50 are separated by a barrier or wall 54 having a passage 56 therein. The wall 54 preferably has dimensions that correspond to the height and width of the reservoir 16, as shown in FIG. 4. However, in alternate embodiments, the wall 54 may be dimensioned such that it does not extend the entire height and width of the reservoir 16. A heating element 58 is located within the boiling compartment 50 to convert water into steam. The receiving compartment 48 includes an aperture 60 in an upper region thereof to vent heated air or steam to the atmosphere. Furthermore, for reasons explained below, the receiving compartment 48 also includes a valve actuator stem 62 located therein.

As shown in FIG. 1, the water tank 14, along with the reservoir 16 and the outer housing 25, defines a portion of the external surface 44 of the steam oven 10. The water tank 14 includes a handle 46 for removing the water tank 14 from the steam oven 10 and for transporting the water tank 14 to a water source for filling. In addition, the water tank 14 includes a fill opening 47 through which the water tank 14 is filled with water. A fill cap 43 covers the fill opening 47. Furthermore, the water tank 14 includes a discharge opening 49 through which water is discharged into the reservoir 16. A conventional, spring-biased discharge valve assembly 45 is disposed in the discharge opening 49 to regulate the flow of water from the water tank 14.

As best shown in FIG. 4, the reservoir 16 includes a ledge 64 upon which the water tank 14 rests when it is placed on top of the reservoir 16. A gasket may be placed on the ledge 64 to create a seal between the reservoir 16 and the water tank 14. The fill cap compartment 52 accommodates the fill cap 43 of the water tank 14 when the water tank 14 is placed on the reservoir 16.

When the water tank 14 is placed on top of the reservoir 16, a vacuum is formed at the top of the water tank 14. As shown in FIG. 3, the actuator stem 62 in the receiving compartment 48 forces the spring-biased valve 63 into the water tank 14 away from the discharge opening 49. Consequently, air is allowed to flow into the water tank 14 (i.e., from an area of atmospheric pressure to an area of zero or near-zero pressure). As air enters the water tank 14, water is forced to flow from the water tank 14 into the receiving compartment 48, and subsequently through the passage 56 into the boiling compartment 50. When the water level in the receiving compartment 48 reaches the bottom 65 of the discharge valve assembly 45, the flow of air into the water tank 14 is interrupted and the water flow from the water tank 14 thereby ceases.

The heating element 58 in the boiling compartment 50 converts the water present therein into steam. As will be explained below, the heating element 58 initially operates at 1500 W to quickly boil the water, and subsequently the power is lowered to 750 W to reduce the rate of steam generation. The resultant steam rises in the boiling compartment 50 and travels to the chamber 28 through a steam tube 68 interconnecting the boiling compartment 50 and the chamber 28. The boiling compartment 50 includes a baffle 70 located in an upper region thereof to prevent water from entering into the steam tube 68.

As the water is converted into steam, additional water flows from the receiving compartment 48 into the boiling compartment 50. As is known in the art, when sufficient water has flowed to the boiling compartment 50 to uncover the bottom 65 of the discharge valve assembly 45, air flows into the water tank 14 and additional water is discharged into the receiving compartment 48. When the bottom 65 of the discharge valve assembly 45 is again covered with water, the flow of water ceases.

When the heating element 58 is activated, the water in the boiling compartment 50 is heated. The heat from the water in the boiling compartment 50 is eventually transferred to the air present therein. The wall 54 separating the receiving compartment 48 and the boiling compartment 50 retards the transfer of heat from the air and water in the boiling compartment 50 to the air and water in the receiving compartment 48. The only avenue for direct heat transfer between the receiving and boiling compartments 48, 50 is through the passage 56, which is relatively small in comparison to the surface area of the wall 54. Thus, the wall 54 insulates the receiving compartment 48 from the boiling compartment 50, and reduces the heating of the air and water present in the receiving compartment 48.

If the wall 54 were not present to separate the receiving and boiling compartments 48, 50, the heated water in the reservoir 16, as it progressed to boiling, would become increasingly agitated. As discussed above, the convulsive motion of the water would cause the water to periodically uncover the bottom 65 of the discharge valve 45, even though the normal water level in the reservoir 16 would cover the bottom 65 of the discharge valve 45. As a result, air would periodically be allowed to flow into the water tank 14, thereby forcing water to flow from the water tank 14 into the reservoir 16. Such untimely and unregulated discharge of water from the water tank 14 could cause a water overflow from the reservoir 16, which is an undesirable and potentially dangerous occurrence. In addition, to further protect against the build-up of heat in the receiving compartment 48, the receiving compartment 48 is provided with an aperture 60 that communicates with the atmosphere. The aperture 60 vents heated air and steam from the receiving compartment 48 to the environment surrounding the steam oven 10.

In an alternate embodiment, the receiving and boiling compartments 48, 50 may take the form of two compartments that are spaced apart from one another and interconnected by means of a passage or tube disposed therebetween. The spatial distance (i.e., air) between the two compartments would function as a heat transfer reduction medium, as does the wall 54 discussed above in the preferred embodiment.

The steam generated in the boiling compartment 50 enters the chamber 28 in a middle region thereof, as is shown by the holes 74 provided in the outer housing 25 and the inner housing 26 to accommodate the steam tube 68. A diffuser (not shown) may be disposed around the hole 74 inside the chamber 28 to swirl the incoming steam. The steam of course rises to the top of the chamber 28, and it is this region that is initially heated by the steam. As steam continues to enter the chamber 28, eventually the entire chamber 28, including the bottom region thereof, reaches a substantially uniform temperature. A steam vent 78, preferably including a louver 77 to direct the steam, is provided in the bottom region of the chamber 28 to vent excess steam to the atmosphere.

The temperature in the steam oven 10 is regulated by a thermostat 76 positioned at the bottom region of the chamber 28. The thermostat 76 may either be positioned in the interior of the chamber 28 or on the outside wall of the outer housing 25. In addition, the thermostat 76 may directly read the steam temperature itself, or a leaf-spring may be utilized to transfer the heat to the thermostat 76.

When the thermostat 76 reads a pre-determined temperature (e.g., 200° F.), the thermostat 76 reduces the operating power of the heating element 58 from 1500 W to 750 W. If the operating power of the heating element 58 is maintained at 1500 W during the entire steaming operation, an undue amount of steam is generated and subsequently vented from the chamber 28 through the steam vent 78, which may result in a safety hazard for the user of the steam oven 10. By reducing the operating power of the heating element 58, the temperature of the steam oven 10 is maintained in a desirable cooking range and an undue and/or unsafe amount of steam is prevented from being vented to the atmosphere.

As shown in FIGS. 1 and 2, the control panel 18 of the steam oven 10 is operatively associated with the heating element 58. The timer 20, which may be digital instead of the analog variety shown, includes a switch for activating the heating element 58 for the time period set by the user of the steam oven 10. As is conventional, after the time period has expired the timer 20 deactivates the heating element 58. The pilot light 21 indicates that the heating element 58 is activated.

As shown in FIG. 2, the control panel 18 includes a back panel 80 connected to the reservoir 16 and to a middle panel 82. The space defined between the back panel 80 and the middle panel 82 accommodates the wiring and circuitry for the control panel 18, the thermostat 76, and the heating element 58. The middle panel 82 includes a recess 84 wherein the front panel 86 is situated. To prevent the need for different control panels when varying types of control mechanisms (i.e., a digital timer instead of a analog timer) are used on specific models of the steam oven 10, the front panel 86 may be removed from the control panel 18 and interchanged with different front panels.

To further control the operation of the heating element 58, the steam oven 10 includes an automatic thermostat cut-off switch (not shown) that deactivates the heating element 58 when the boiling compartment 50 becomes too hot. Frequently, this phenomenon occurs when all the water present in the boiling compartment 50 is boiled off. In addition, the door 12 of the steam oven 10 includes a cut-off switch 72 that deactivates the heating element 58 when the door is opened.

In use, the water tank 14 is removed from the steam oven 10, filled with water, and replaced. The door 12 of the steam oven 10 is opened, and the food tray(s) 30 removed from the chamber 28 to place food thereon. The food tray(s) 30 is repositioned in the chamber 28, and the door 12 is closed. As the food is being placed in the chamber 28, water flows from the water tank 14 into the receiving compartment 48, and subsequently into the boiling compartment 50. The timer 20 is set to the proper time period for food steaming, and the heating element 58 is thereby activated. The heating element 58 converts the water in the boiling compartment 50 into steam, and the steam is directed through the steam tube 68 into the chamber 28 to cook the food. When the temperature of the steam reaches a pre-determined level at the bottom portion of the chamber 28, the thermostat 76 lowers the power to the heating element 58 to reduce the rate of steam production. After the set time period for cooking expires, the timer switch deactivates the heating element 58, and the door 12 is opened to remove the food from the chamber. To prepare the steam oven 10 for its next use, the drip tray 40 is removed from the base 24, the condensate collected therein is disposed of, and the drip tray 40 is repositioned in the base 24.

The following materials may be used with the present invention: the heating element 58 may be a sheathed-type tubular heating element rated at 1500/750 Watts and 110/120 Volts; the food tray(s) 30 may be formed of clear polycarbonate; and the water tank 14, the reservoir 16 and housings 25, 26 of the steam oven 10 may be formed of plastic or metal. In addition, the steam oven 10 may be 12" wide by 12" long by 14" high. However, the steam oven 10 may be appropriately sized for the specific application.

As stated above, the present invention provides a reservoir 16 that is configured to prevent air from entering into the water tank 14 and causing untimely and unregulated water flow therefrom. Furthermore, because the heating element 58 is initially operated at 1500 W, the present invention also provides a steam oven 10 that quickly cooks foods, as shown in the Results below.

STEAM OVEN COOKING RESULTS

A variety of foods were cooked in different types of steam ovens, two of which were the plastic and metal versions (labeled "Auto-Shift" in the table below) of the steam oven of the present invention. The type and amount (in weight) of food cooked, and the time period for the respective oven to adequately cook the food, was recorded or estimated. The results are shown below.

| Unit | Food (2 lb. loads) | Total Cook Time Incl. Preheat | Preheat Time |
|---|---|---|---|
| Rival Oval | | | |
| Model 4450 6300 watts | Shrimp | 19 mins. | — |
| | Carrots | 29 min. | — |
| | Potatoes (½) | 35 min. | — |
| Commercial Oven 4200 watts | Shrimp | Est. 16 min. | Est. 11 min. |
| Steam Oven 1500 watts Metal Model | Shrimp | 11 min. | 4 min. |
| | Carrots | 18 min. | 4 min. |
| | Potatoes (½) | 35 min. | 4 min. |
| Steam Oven Auto-Shift 1500/750 watts Metal Model Steam Oven Auto-Shift 1500/750 watts Plastic Model | Shrimp | — | — |
| | Carrots | 18 min | 4 min. |
| | Potatoes (½) | 35 min. | 4 min. |
| A. Cold Start | Shrimp | 9 ½ | Est. 2 min. |
| | Carrots | 14 ½ min. | Est. 2 min. |
| | Potatoes (½) | 32 min. | Est. 2 min. |
| B. Hot Start | Shrimp | — | — |
| | Carrots | 12 ½ min. | Est. 2 min. |
| | Potatoes | — | — |

As shown above, both versions of the steam oven of the present invention were able to cook a variety of foods in an equal or shorter amount of time than the other ovens. In addition, the cooking times for the plastic version of the steam oven of the present invention were observed to be shorter than those for the metal version. It is believed that these time differences are due to the greater insulative properties of the plastic material.

It should be appreciated that the present invention may be modified or configured as appropriate for the application. The embodiment described above is to be considered in all respects only as illustrative and not restrictive. Changes may be made without departing from the spirit of the invention. The scope of the invention is indicated by the following claims rather than by the foregoing description. All changes which come within the literal meaning as well as the range of equivalency of the claims are to be embraced within their scope.

I claim:

1. A steam oven comprising:
   a chamber for receiving food;
   a water tank comprising a discharge valve;
   a reservoir in communication with the water tank and the chamber, the reservoir comprising
      a receiving compartment, and
      a separate boiling compartment in fluid communication with the receiving compartment;
   whereby water flows from the water-tank into the receiving compartment, and then from the receiving compartment into the boiling compartment to be converted into steam, the separate boiling compartment operable to retard heat transfer from the water in the boiling compartment to the water in the receiving compartment to prevent the water in the receiving compartment from becoming agitated to an extent where air would be allowed to flow through the discharge valve into the water tank, thereby causing an untimely release of water from the water tank into the reservoir.

2. The steam oven of claim 1 wherein the receiving compartment defines an aperture in communication with the atmosphere, the aperture operable to vent heated air to the atmosphere.

3. The steam oven of claim 1 wherein the water tank is removable.

4. The steam oven of claim 1 wherein the water tank is supported on top of the reservoir.

5. The steam oven of claim 4 wherein the reservoir further comprises a top surface having a ledge, and wherein the water tank comprises a bottom wall having an edge portion, the edge portion of the water tank resting on the ledge of the reservoir.

6. The steam oven of claim 1, further comprising a barrier separating the receiving compartment from the boiling compartment, and further wherein the barrier defines a passage between the receiving compartment and the boiling compartment.

7. A steam oven comprising:

a chamber for receiving food;

a water tank; and a reservoir in communication with the water tank and the chamber, the reservoir comprising a receiving compartment defining an aperture in communication with the atmosphere, and a separate boiling compartment in fluid communication with the receiving compartment;

whereby water flows from the water tank into the receiving compartment, and then from the receiving compartment into the boiling compartment to be converted into steam, the aperture operable to vent heated air in the receiving compartment to the atmosphere.

8. The steam oven of claim 7, further comprising a barrier separating the receiving compartment from the boiling compartment, and further wherein the barrier defines a passage between the receiving compartment and the boiling compartment.

9. The steam oven of claim 8 wherein the barrier is operable to reduce heat transfer between the water in the boiling compartment and the water in the receiving compartment.

10. The steam oven of claim 7, further comprising a steam tube disposed between the boiling compartment and the chamber, the steam tube operable to transfer steam from the boiling compartment to the chamber.

11. The steam oven of claim 10, further comprising a baffle located in the boiling compartment below the steam tube, the baffle operable to prevent water in the boiling compartment from entering into the steam tube.

12. The steam oven of claim 7 wherein the water tank is removable.

13. The steam oven of claim 12 wherein the water tank further comprises a handle for facilitating the removal of the water tank.

14. The steam oven of claim 7 wherein the water tank further comprises a fill cap, and wherein the reservoir further comprises a third compartment sized to accommodate the fill cap.

15. The steam oven of claim 7 wherein the water tank is supported on top of the reservoir.

16. The steam oven of claim 15, wherein the reservoir further comprises a top surface having a ledge, and wherein the water tank comprises a bottom wall having an edge portion, the edge portion of the water tank resting on the ledge of the reservoir.

17. The steam oven of claim 7 wherein the water tank defines a portion of an external surface of the steam oven.

18. The steam oven of claim 7, further comprising a heating element disposed in the boiling compartment.

19. The steam oven of claim 18, further comprising a switch operatively associated with the heating element, the switch operable to adjust the power delivered to the heating element.

20. A steam oven comprising:

a chamber for receiving food;

a water tank comprising a discharge valve, and a water fill cap; and a reservoir in communication with the water tank and the chamber, the reservoir comprising a receiving compartment defining an aperture in communication with the atmosphere, the aperture operable to vent heated air in the receiving compartment to the atmosphere, a boiling compartment, a barrier separating the receiving compartment and the boiling compartment, the barrier defining a passage allowing the receiving compartment and the boiling compartment to fluidly communicate with each other, and a third compartment for accommodating the water fill cap of the water tank;

whereby water flows from the water tank into the receiving compartment, and then from the receiving compartment into the boiling compartment to be converted into steam, the barrier operable to retard heat transfer from the air and water in the boiling compartment to the air and water in the receiving compartment to prevent the water in the receiving compartment from becoming agitated to an extent where air would be allowed to flow through the discharge valve into the water tank, thereby causing an untimely release of water from the water tank into the reservoir.

\* \* \* \* \*